(12) United States Patent
Eddy et al.

(10) Patent No.: US 11,014,648 B2
(45) Date of Patent: May 25, 2021

(54) INTERCONNECTED SIDESTICKS FOR FLY-BY-WIRE FLIGHT CONTROL

(71) Applicant: Textron Aviation Inc., Wichita, KS (US)

(72) Inventors: Stephen M. Eddy, Derby, KS (US); Jeremy Phillip Taylor, Bel Aire, KS (US); Steven G. Hagerott, Wichita, KS (US); Philippe A. Ciholas, Sedwick, KS (US)

(73) Assignee: Textron Innovations, Inc., Providence, RI (US)

( * ) Notice: Subject to any disclaimer, the term of this patent is extended or adjusted under 35 U.S.C. 154(b) by 474 days.

(21) Appl. No.: 15/949,232

(22) Filed: Apr. 10, 2018

(65) Prior Publication Data

US 2018/0297691 A1 Oct. 18, 2018

Related U.S. Application Data (60) Provisional application No. 62/486,074, filed on Apr. 17, 2017.

(51) Int. Cl.
*B64C 13/12* (2006.01)
*B64C 13/50* (2006.01)
(Continued)

(52) U.S. Cl.
CPC .......... *B64C 13/12* (2013.01); *B64C 13/0421* (2018.01); *B64C 13/10* (2013.01);
(Continued)

(58) Field of Classification Search
CPC ....... B64C 13/12; B64C 13/16; B64C 13/507; B64C 13/503; B64C 13/10; B64C 13/18; B64C 13/0421; B64C 13/345
See application file for complete search history.

(56) References Cited

U.S. PATENT DOCUMENTS 3,902,379 A * 9/1975 Bennett .................. B64C 13/12
74/480 R
5,456,428 A 10/1995 Hegg
(Continued)

FOREIGN PATENT DOCUMENTS

EP 0708726 A1 * 5/1996 ........... B64C 13/503
EP 0708726 B1 5/1996
(Continued)

OTHER PUBLICATIONS

French Patent Application 1853234, Search Report dated Feb. 6, 2020, with machine translation.

*Primary Examiner* — Assres H Woldemaryam
(74) *Attorney, Agent, or Firm* — Erise IP, P.A.

(57) ABSTRACT

An interconnected flight controller for an aircraft includes a mechanical linkage connecting a pilot interface with a copilot interface. When an input is provided to either of the pilot or copilot interfaces, coordinated motion is provided between them of a proportional magnitude and direction. A mechanical-disconnect element within the mechanical linkage is adapted to actuate mechanical decoupling between the pilot interface and the copilot interface. One or more sensors is coupled to the mechanical linkage to sense inputs and communicate the inputs to a fly-by-wire flight controller. An autopilot servo is coupled to the mechanical linkage for providing autopilot control or feedback and a force-feedback subsystem is connected to the mechanical linkage to simulate and apply an opposing force of aircraft control surfaces to the pilot interface and the copilot interface.

18 Claims, 4 Drawing Sheets

(51) Int. Cl.
  *B64C 13/10* (2006.01)
  *B64C 13/18* (2006.01)
  *B64C 13/04* (2006.01)
  *B64C 13/28* (2006.01)
  *B64C 13/16* (2006.01)

(52) U.S. Cl.
  CPC .............. *B64C 13/16* (2013.01); *B64C 13/18* (2013.01); *B64C 13/345* (2018.01); *B64C 13/503* (2013.01); *B64C 13/507* (2018.01)

(56) References Cited

U.S. PATENT DOCUMENTS

| | | | |
|---|---|---|---|
| 6,067,077 A | * | 5/2000 | Martin .................... A63F 13/06 345/161 |
| 8,469,317 B2 | | 6/2013 | Burroughs et al. |
| 9,090,337 B2 | | 7/2015 | Tessier et al. |
| 2005/0080495 A1 | | 4/2005 | Tessier et al. |
| 2005/0080945 A1 | * | 4/2005 | Carroll .................... H04L 49/55 710/33 |
| 2010/0305780 A1 | | 12/2010 | Sataka |
| 2014/0077025 A1 | * | 3/2014 | Yates ..................... B64D 43/00 244/17.13 |
| 2014/0097300 A1 | * | 4/2014 | Kennedy ................ B64C 13/12 244/229 |
| 2015/0203188 A1 | * | 7/2015 | Piotrowski ............. B64C 13/12 244/76 R |
| 2016/0214704 A1 | * | 7/2016 | Antraygue ........... G05D 1/0808 |

FOREIGN PATENT DOCUMENTS

| | | | | |
|---|---|---|---|---|
| GB | 2484830 | * | 4/2012 | ............ B64C 13/12 |
| GB | 2484830 A | | 4/2012 | |
| JP | 10264894 A | | 10/1998 | |
| WO | 03040844 A2 | | 3/2003 | |
| WO | WO-03040844 A2 | * | 5/2003 | ......... B64C 13/0421 |

* cited by examiner

INTERCONNECTED SIDESTICKS FOR FLY-BY-WIRE FLIGHT CONTROL

CROSS-REFERENCE TO RELATED APPLICATIONS

This application claims the benefit of U.S. Provisional Patent Application Ser. No. 62/486,074 entitled Method and System For Providing Fly-By-Wire Roll and Pitch Through Two Interconnected Sidesticks and filed Apr. 17, 2017, the disclosure of which is herein incorporated by reference in its entirety.

BACKGROUND

1. Field

Embodiments of this disclosure relate generally to aircraft controls. More specifically, the embodiments relate to the use of sidestick controllers.

2. Description of Related Art

Prior art in this field relates generally to mechanically-linked sidesticks that do not decouple, are decoupled directly by the pilot, or are not mechanically linked.

U.S. Pat. No. 8,469,317 to Burroughs et. al. discloses a dual sidestick fly-by-wire control system that selectively utilizes push-pull interconnecting rods. A restoring force and tactile feedback is provided to the sticks. However, the system does not receive input during autopilot control.

U.S. Pat. No. 5,456,428 to Hegg discloses a fly-by-wire sidestick control system that utilizes active control coupling with a back-driven servo for a secondary stick. In the event of failure, a clutch is used to transfer control from the fly-by-wire system to a redundant cable assembly connecting the two sidesticks. The cable assembly lacks decoupling capabilities.

U.S. Pat. No. 9,090,337 to Tessier et. al. discloses a fly-by-wire system providing force-feel gradients and centering force for sidesticks. The sidesticks may be decoupled in the case of a jam or force fight between pilots, but there is no continuous mechanical linkage between the sticks.

SUMMARY

In an embodiment, a dual sidestick fly-by-wire mechanically linked flight control system is provided. The mechanical linkage may comprise a combination of, but is not limited to, low friction pulleys, cables, gears, and pushrods. The mechanical linkage allows each of the sidesticks to move in concert when input is applied to one of the sidesticks. The mechanical linkage may also be referred to as mechanically interconnected or a mechanically interconnected assembly. Feel and centering force, that may be either static or dynamic, is provided to the sidesticks. Tactile cues for stall warning and end of aerodynamic control authority are also provided. The sidesticks are also capable of moving with respect to autopilot commands.

In another embodiment, an interconnected flight controller for an aircraft is provided. The interconnected flight controller includes a pilot interface and a copilot interface, a mechanical linkage connecting the pilot interface with the copilot interface for providing motion between them of a proportional magnitude and direction when an input is provided to either of the pilot interface or the copilot interface. The interconnected flight controller further includes a mechanical-disconnect element within the mechanical linkage, the mechanical-disconnect element being adapted to actuate mechanical decoupling between the pilot interface and the copilot interface. One or more sensors are coupled to the mechanical linkage on a pilot side of the mechanical-disconnect element for sensing pilot inputs and communicating the pilot inputs to a fly-by-wire flight controller, and one or more sensors are coupled to the mechanical linkage on a copilot side of the mechanical-disconnect element for sensing copilot inputs and communicating the copilot inputs to the fly-by-wire flight controller.

In yet another embodiment, an interconnected sidestick system for controlling an aircraft is provided. The interconnected sidestick system includes a first sidestick located on a first side of a cockpit of the aircraft for controlling the aircraft by a pilot and a second sidestick on a second side of the cockpit, opposite the first side, for controlling the aircraft by a copilot. The system further includes a roll mechanical linkage mechanically connecting the first sidestick with the second sidestick for providing coordinated motion between them when a roll input is provided to either of the first or the second sidestick, a roll mechanical-disconnect element within the roll mechanical linkage for disconnecting roll inputs between the first sidestick and the second sidestick, and a roll autopilot servo coupled to the roll mechanical linkage for providing autopilot control or feedback to the pilot interface and the copilot interface via the roll mechanical linkage. The system also includes a pitch mechanical linkage mechanically connecting the first sidestick with the second sidestick for providing coordinated motion between them when a pitch input is provided to either of the first or the second sidestick, a pitch mechanical-disconnect element within the pitch mechanical linkage for disconnecting pitch inputs between the first sidestick and the second sidestick, and a pitch autopilot servo coupled to the pitch mechanical linkage for providing autopilot control or feedback to the pilot interface and the copilot interface via the pitch mechanical linkage.

BRIEF DESCRIPTION OF THE DRAWINGS

Illustrative embodiments of the invention are described in detail below with reference to the attached drawing figures, which are incorporated by reference herein and wherein.

DETAILED DESCRIPTION

Embodiments of the present disclosure provide mechanically linked control sticks having disconnect capabilities for a fly-by-wire flight-control system. Feedback from sensors is provided to the sidesticks, and autopilot engagement is enabled with motion feedback.

Figure 1:
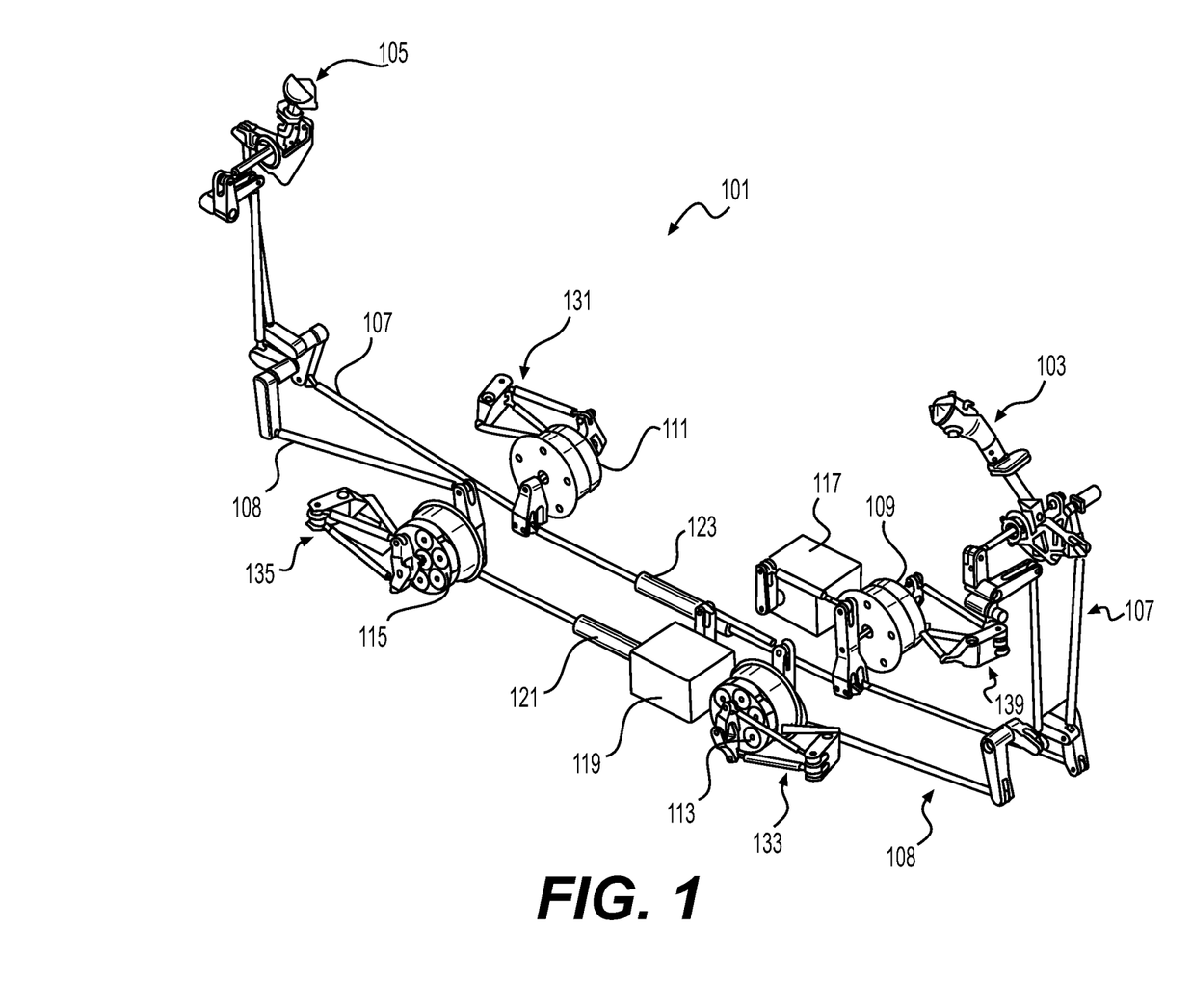
FIG. 1 shows a perspective view of an embodiment of interconnected sidesticks for a fly-by-wire flight control system.

FIG. 1 shows a perspective view of exemplary interconnected sidesticks for a fly-by-wire flight control system 101. System 101 includes a pilot interface having two sidesticks, a pilot sidestick 103 for pilot control, and a copilot sidestick 105 for copilot control. In certain embodiments, each sidestick is located outboard of its respective user in the cockpit of an aircraft. Each of the pilot and copilot sidesticks 103, 105 includes a grip interface for handling by the pilot or copilot and a structural stick for mechanically connecting with a roll mechanical linkage 107 and a pitch mechanical linkage 108 for interconnecting the two sidesticks.

In certain embodiments, the pilot and copilot sidesticks 103, 105 include a first sidestick and a second sidestick that are configured as mirror images of one another. In other words, as depicted in FIG. 1, the first sidestick (e.g., pilot sidestick 103) is a left-handed sidestick, while the second sidestick (e.g., copilot sidestick 105) is a right-handed sidestick. The pilot and copilot sidestick arrangements may be reversed without departing from the scope hereof. In certain embodiments, the pilot and copilot sidesticks 103, 105 may alternatively be center sticks, yokes, control wheels, or other pilot interfaces.

Embodiments of the present disclosure provide for configurations that support many types of aircraft and are not limited to sidesticks with a pilot and a copilot positioned in a side-by-side orientation. For example, a pilot and a copilot may alternatively be positioned in a front-to-back tandem-style orientation. The pilot and the copilot may be seated side-by-side using sidesticks, center sticks, control wheels, and/or yokes. Similarly, the pilot and copilot may be seated in a tandem orientation using sidesticks, center sticks, control wheels, and/or yokes. The scope of the invention is not limited by the pilot-copilot configuration of the aircraft or by the pilot interface used.

The pilot and copilot sidesticks 103, 105 move in concert due to the mechanically coupling provided by the roll mechanical linkage 107 and the pitch mechanical linkage 108. In other words, when an input is provided to either of the pilot or copilot sticks, movement is mimicked by the opposite sidestick. Exemplary connections for coupling the pilot and copilot sidesticks include, but are not limited to, pushrods with high tolerance, low friction connections, a low friction cable and pulley assembly, or a combination of pushrods and cables. In certain embodiments, the mechanical linkages 107, 108 may intentionally produce unsymmetrical deflection of the opposite sidestick, resulting in desired unsymmetrical feel force (e.g., during a roll maneuver) to account for human factors such as arm leverage limitation.

A pitch mechanical-disconnect element 121 on the pitch mechanical linkage 108 allows for pitch mechanical decoupling of the sidesticks 103, 105. Similarly, a roll mechanical-disconnect element 123 on the roll mechanical linkage 107 allows for roll mechanical decoupling of the sidesticks 103, 105. The pitch disconnect element 121 is located between the two sidesticks 103, 105 to allow them to be mechanically disconnected if a jam occurs at any point in the system, thereby providing at least one crew member with pitch control capabilities. Similarly, the roll disconnect element 123 is located between the two sidesticks 103, 105 allowing them to be mechanically disconnected if a jam occurs at any point in the flight control system 101, thereby providing at least one crew member with roll control capabilities.

The pitch and roll disconnect elements 121, 123 may include a crew actuated physical release mechanism, a spring-loaded (e.g., force based) over-center mechanism, a spring-loaded force-fight mechanism, or another mechanical device that allows for physical decoupling of the two sidesticks 103, 105. The crew actuated physical release and the spring-loaded over-center mechanisms provide a latching disconnect, while the force fight mechanism provides a differential motion between the two sidesticks 103, 105 once a specified force is applied.

Command inputs made through the pilot and copilot sidesticks 103, 105 are sensed by sensors and communicated to a fly-by-wire flight control system. In certain embodiments, the sensors are located within sidesticks 103, 105. In some embodiments, a plurality of sensors are grouped together in a sensor pack, such as the sensor packs 109, 111, 113, and 115, which may be attached to the roll and pitch mechanical linkages 107, 108. A sensor pack may simply be a sensor subsystem having an arrangement of sensors grouped together. Sensor subsystems, in some embodiments, can include motion sensors, accelerometers, position sensors, etc. These subsystems are referred to in the art as "sensor packs", one example being the Sensalot™ sensor pack manufactured by Johnson, Inc., Wichita, Kans.

As depicted in FIGS. 1-4, on the side of the pilot sidestick 103, a pilot roll-sensor pack 109 is attached to the roll mechanical linkage 107 and a pilot pitch-sensor pack 113 is attached to the pitch mechanical linkage 108. Similarly, on the side of the copilot sidestick 105, a copilot roll-sensor pack 111 is attached to the roll mechanical linkage 107 and a copilot pitch-sensor pack 115 is attached to the pitch mechanical linkage 108. The sensors detect motion by either rotary (e.g., a rotary variable differential transformer) or linear position sensing methods (e.g., a linear variable differential transformer). For example, the sensors may be of rotary position sensing type that read bell crank position in the roll and pitch mechanical linkages 107, 108.

In an alternative embodiment, motion detection may rely on force sensors located in the sidesticks 103, 105, or within a force-feedback subsystem (described below). In the event that the two sidesticks decouple, the sensors may be applied on either side of the disconnect to provide feedback from either of the sidesticks 103, 105 to the flight control system 101.

In some embodiments, a roll autopilot servo 117 is connected to the roll sensor packs 109, 111, and the sidesticks 103, 105 via the roll mechanical linkage 107, and a pitch autopilot servo 119 is connected to the pitch sensor packs 113, 115, and the sidesticks 103, 105 via the pitch mechanical linkage 108. The locations of the autopilot servos 117, 119 are not limited by the locations depicted in FIG. 1-4, or the description herein. The roll autopilot servo 117 may connect at additional locations along the roll mechanical linkage 107, and the pitch autopilot servo may connect at additional locations along the pitch mechanical linkage 108, without departing from the scope hereof. The servos may be electromechanical, hydro-mechanical, or any other actuation device capable of performing the desired action. The roll autopilot servo 117 and the pitch autopilot servo 119 may be swapped without departing from the scope hereof. The aircraft may be controlled equally by either the pilot or copilot via the sidesticks 103, 105, respectively, or by the aircraft roll and pitch autopilot servos 117, 119.

Roll autopilot servo 117 provides roll feedback and control when an autopilot function is activated. Pitch autopilot servo 119 provides pitch feedback and control when the autopilot function is activated. Each servo can be used solely for position feedback for the sidesticks 103, 105 based on the autopilot operation commands sent directly to a flight computer digitally. In other words, the feedback is arranged parallel to operation. Also, each servo may provide the autopilot inputs directly to the sidesticks 103, 105, which results in the sidesticks 103, 105, motion commanding the fly-by-wire system 201 (e.g., a series command arrangement). The servos may be over-ridden and/or disconnected by one or more of force over-ride, switch disconnect, monitoring of the fly-by-wire system 101 and monitoring of the roll and pitch autopilot servos 117, 119. For example, the servos may be over-ridden based on monitoring of a desired stick position signal versus an actual stick position, which includes detection of a manual override scenario. Autopilot roll and pitch control are capable of mechanically decoupling the sidesticks via the roll disconnect element 123 and the pitch disconnect element 121, respectively.

In some embodiments, autopilot commands may be provided via electrical signaling (e.g., from a flight-control computer) directly into a fly-by-wire flight controller without providing a corresponding motion of control sticks (e.g., pilot interfaces).

Force may be applied to the sidesticks 103, 105 via a force-feedback subsystem to enable the pilot to feel a response to input by the aircraft. The force-feedback subsystem simulates an opposing force of the control surfaces, (e.g., a force feel), which may be provided when an input is applied to the sidesticks 103, 105. When no input is applied, a feel and a centering alignment of the stick is provided. In certain embodiments, a force-feedback subsystem is connected directly to each of the sensor packs 109, 111, 113, and 115. For example, a pilot-roll force-feedback subsystem 139 is connected with the pilot roll-sensor pack 109, a pilot-pitch force-feedback subsystem 133 is connected with the pilot pitch-sensor pack 113, a copilot-roll force-feedback subsystem 131 is connected with the copilot roll-sensor pack 111, and a copilot-pitch force-feedback subsystem 135 is connected with the copilot pitch-sensor pack 115. In certain embodiments, the pilot and copilot pitch force-feedback subsystems 133, 135 are variable-pitch feel subsystems.

In certain embodiments, fixed springs (e.g., linear or rotary) provide a preset force and force gradient to the sidesticks 103, 105. The pitch and roll axes may each rely on separate sets of springs to provide a separate force gradient for each axis of rotation. One half of the spring force may be located on each side of the pitch mechanical-disconnect element 121, as well as the roll mechanical-disconnect element 123. In this manner, when both sidesticks 103, 105 are coupled and working in unison, the two spring sets sum to provide the total desired force gradient for the axis. When the sidesticks 103, 105, are decoupled via disconnect elements 121, 123, half of the force is available for each sidestick 103, 105 to provide sufficient feel and centering for continued safe flight.

In certain embodiments, the spring force may be mechanically adjusted for fine tuning the feel force of the flight control system 101. The feel force is adjusted based on the motion of the actuator that increases or decreases the preload and/or force gradient of the springs. A clamping type of rotary spring may be used to reduce potential free play in the force-feedback subsystems 131, 133, 135, 139. In some embodiments, the spring force may be replaced or aided by an actuator or servo that provides dynamic load to the flight control system 101 based on aircraft condition or envelope protection activation. In some embodiments, the force generation is tied to the roll and pitch mechanical linkages 107, 108 via sensor packs 109, 111, 113, and 115. This improves safety and prevents erroneous sensor readings due to component failure.

In certain embodiments, a motion damping device may be included that damps the motion of the individual and/or the coupled sidesticks 103, 105 to prevent induction of oscillation from the sidesticks 103, 105 into the flight control system 101. The motion damping device may also ensure an adequately damped system step response across the range of spring constants provided by the variable-feel subsystems. The device may be linked to portions of the roll and pitch mechanical linkages 107, 108, such as the feel subsystem, or directly to sidesticks 103, 105. The damping device may be installed on one or both axes (e.g., pitch and roll) of control, and may be installed on each sidestick 103, 105 to provide damping on both sticks 103, 105 when decoupled.

In certain embodiments, adjustable hard stops may be incorporated to limit travel of the sidesticks 103, 105, based on aircraft conditions and control law interactions. The stop locations may be set based on moveable physical stops attached to an actuator or via torque stops in the autopilot servos 117, 119.

In certain embodiments, fixed or adjustable soft stops may be incorporated that result in an increased force gradient of the motion of the sidesticks 103, 105 beyond a predetermined position (e.g., a soft stop position). The increased force gradient may be in the form of a force bias, an increase in the force gradient, a force step change at the soft stop, or any combination thereof. The soft stop locations may be set based on movable feel mechanisms attached to an actuator or via torque stops in the autopilot servos 117, 119.

In certain embodiments, a stick shaker mechanism provides a stall warning indication to the crew. A motor with offset weight, or other vibration device, may be installed on each sidestick 103, 105 assembly (e.g., near the grip interface) to provide tactile feedback to each pilot. In another embodiment, the stick shaker mechanism is installed on the feel mechanism. In yet another embodiment, the stick shaker mechanism may be implemented via a small amplitude, but oscillatory, change to the feel gradient. The stall warning device may be commanded via the avionics or fly-by-wire system 201.

In certain embodiments, a limit device provides small abrupt movements of the sidesticks 103, 105 to prevent the crew from exceeding a limit on the aircraft or to help guide the crew back into a normal operating environment. The limit device may be a solenoid or actuator capable of providing the required stick motion.

Figure 2:
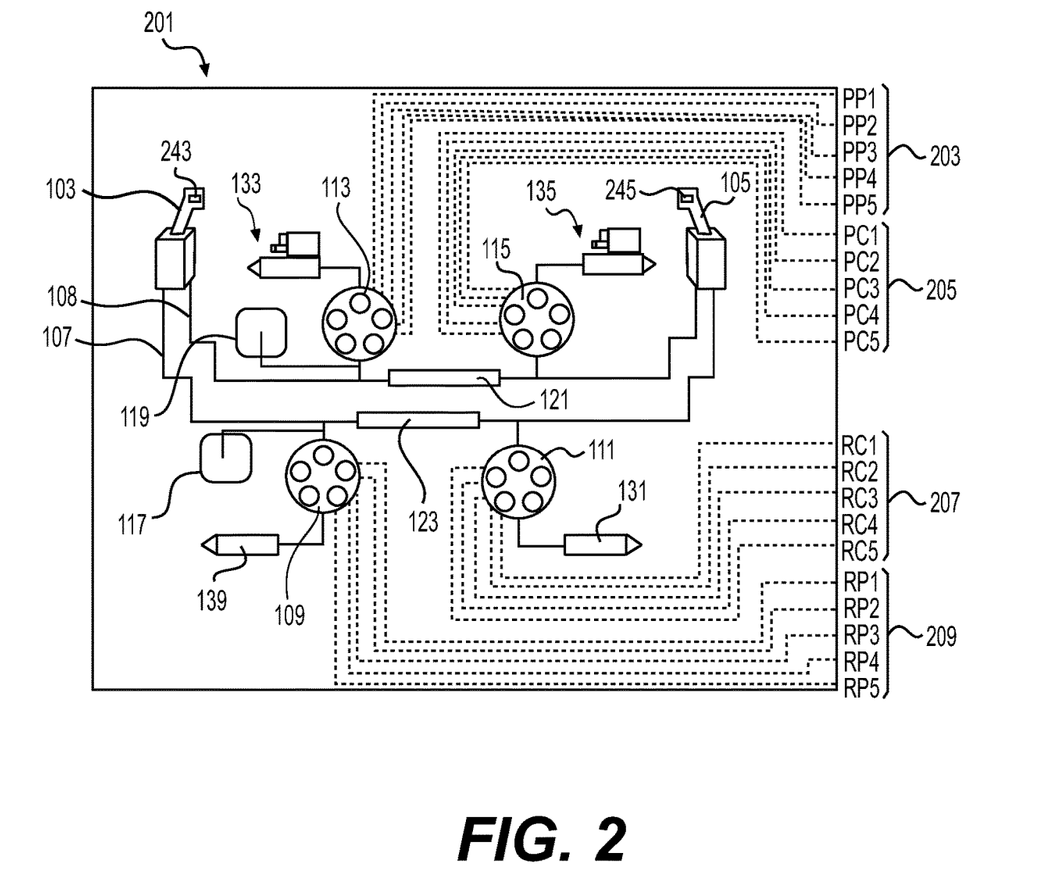
FIG. 2 shows a diagram of an embodiment of a fly-by-wire flight control system having interconnected pilot interfaces.

FIG. 2 shows a diagram of an exemplary fly-by-wire flight control system 201 having interconnected pilot interfaces 103, 105. Features enumerated in FIG. 2 with like numerals to FIG. 1 are substantially the same and their description is not repeated accordingly. In an embodiment, the interconnected pilot interfaces 103, 105 of system 201 include a first sidestick 103 and a second sidestick 105; however, in some embodiments, the pilot interfaces 103, 105 may instead be center sticks, yokes, or control wheels without departing from the scope hereof.

As depicted in FIG. 2, exemplary electrical control wire bundles 203, 205, 207, and 209, which connect sensor packs 113, 115, 111, and 109, respectively, to flight control electronics of the fly-by-wire flight control system 201. The flight control electronics may include a computer (e.g., a flight computer onboard the aircraft) having a memory for storing software instructions and a processor for executing the software instructions. Exemplary software instructions include control law algorithms for a fly-by-wire flight control system.

As depicted in FIG. 2, the electrical control wire bundles 203, 205, 207, and 209 may include a pitch-pilot (PP) wire bundle 203 having a plurality of electrical control wires (e.g., PP1-PP5) connected to the pilot pitch-sensor pack 113; a pitch-copilot (PC) wire bundle 205 having a plurality of electrical control wires (e.g., PC1-PC5) connected to the copilot pitch-sensor pack 115; a roll-copilot (RC) wire bundle 207 having a plurality of electrical control wires (e.g., RC1-RC5) connected to the copilot roll-sensor pack 111; and, a roll pilot (RP) wire bundle 209 having a plurality of electrical control wires (e.g., RP1-RP5) connected to the pilot roll-sensor pack 109. The electrical control wire bundles 203, 205, 207, and 209 may include greater than or fewer than five electrical control wires without departing from the scope hereof.

The grip interface may include one or more switches used for operation of devices or subsystems of the aircraft. For example, the pilot interface 103 may include switches 243 and copilot interface 105 may include switches 245, as depicted in FIGS. 2 and 4.

Figure 3:
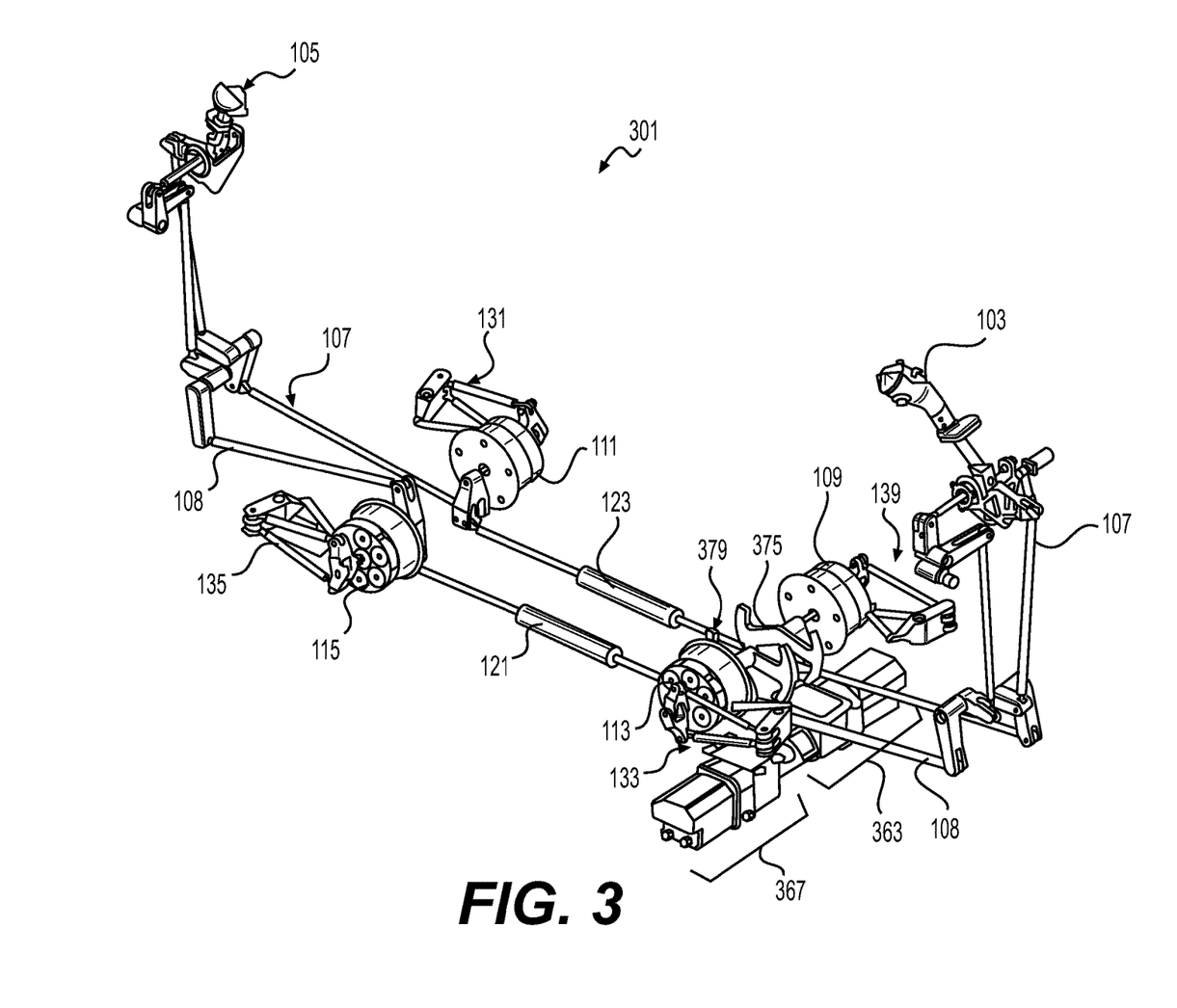
FIG. 3 shows a perspective view of another embodiment of interconnected sidesticks for a fly-by-wire flight control system.

FIG. 3 shows a perspective view of exemplary interconnected sidesticks 103, 105 for a fly-by-wire flight control system 301. Features enumerated in FIG. 3 with like numerals to FIG. 1 are substantially the same and their description is not repeated accordingly. In some embodiments, the pilot and copilot sidesticks 103, 105 may instead be alternative pilot interfaces such as center sticks, yokes, or control wheels, and the arrangement of the pilot interfaces may be in a front-to-back tandem-style orientation, without departing from the scope hereof.

Fly-by-wire flight control system 301 is an example of system 101, FIG. 1, in which the mechanical linkage between sidesticks 103, 105 includes sectors and cables. For example, roll autopilot is provided via a servo 363, which is connected by cables to an autopilot input sector 375. Similarly, pitch autopilot is provided via servo 367, which is connected by cables to an autopilot input sector 379. Input sectors 375, 379 transfer linear motion along the cables (e.g., see cables 483, 489 of FIG. 4) to rotational motion for sensor detection. The mechanical linkage between sidesticks 103, 105 may further include one or more of low friction pulleys, cables, gears, and pushrods. In certain embodiments, autopilot servos 117, 119 of FIG. 1 are replaced with autopilot servos 363, 367 of FIG. 3.

Figure 4:
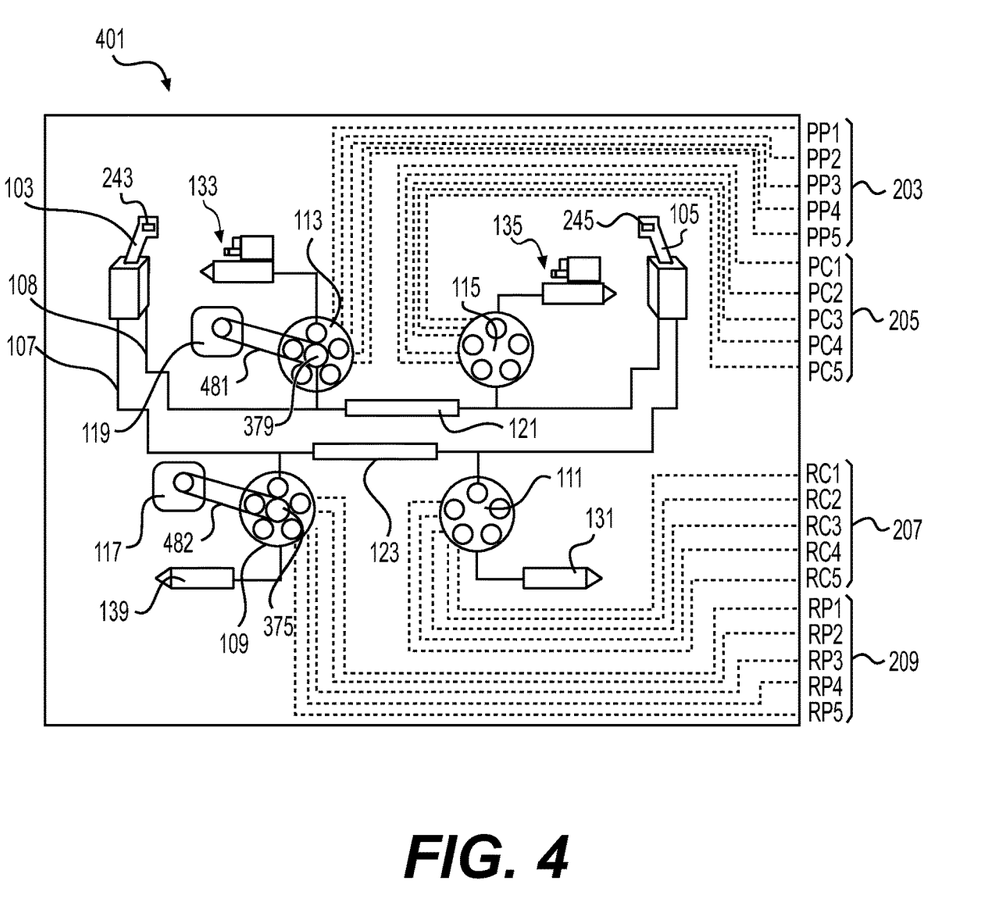
FIG. 4 shows a diagram of another embodiment of a fly-by-wire flight control system having interconnected pilot interfaces.

FIG. 4 shows a diagram of another exemplary fly-by-wire flight control system 401 having interconnected pilot interfaces 103, 105. In some embodiments, the pilot interfaces 103, 105 may be sidesticks, center sticks, yokes, or control wheels, without departing from the scope hereof. System 401 is an example of system 201, FIG. 2, with cables connecting pitch autopilot 119 with autopilot input sector 379 and roll autopilot 117 with autopilot input sector 375. Features enumerated in FIG. 4 with like numerals to FIG. 2 are substantially the same and their description is not repeated accordingly.

As depicted in FIG. 4, a first cable 481 connects pitch autopilot 119 with autopilot input sector 379 and a second cable 482 connects roll autopilot 117 with autopilot input sector 375. First and second cables 481, 482 may include a cable, belt, chain, or other loop for coupling gears of the autopilot servos and input sectors.

Features described above as well as those claimed below may be combined in various ways without departing from the scope hereof. The following examples illustrate some possible, non-limiting combinations:

(A1) An interconnected flight controller for an aircraft may include a pilot interface and a copilot interface, and a mechanical linkage connecting the pilot interface with the copilot interface for providing motion therebetween of a proportional magnitude and direction when an input is provided to either of the pilot interface or the copilot interface. The interconnected flight controller may also include a mechanical-disconnect element within the mechanical linkage, the mechanical-disconnect element being adapted to actuate mechanical decoupling between the pilot interface and the copilot interface, and one or more sensors coupled to the mechanical linkage on a pilot side of the mechanical-disconnect element for sensing pilot inputs and communicating the pilot inputs to a fly-by-wire flight controller. The interconnected flight controller may also include one or more sensors coupled to the mechanical linkage on a copilot side of the mechanical-disconnect element for sensing copilot inputs and communicating the copilot inputs to the fly-by-wire flight controller.

(A2) For the interconnected flight controller denoted as (A1), an autopilot servo may be coupled to the mechanical linkage for providing autopilot control or feedback to the pilot interface and the copilot interface via the mechanical linkage.

(A3) For the interconnected flight controller denoted as either or both of (A1) or (A2), a force-feedback subsystem may be connected to the mechanical linkage to simulate and apply an opposing force of aircraft control surfaces to the pilot interface and the copilot interface.

(A4) For the interconnected flight controller denoted as any one or more of (A1) through (A3), the pilot interface and the copilot interface may be sidesticks located on outboard sides of the pilot and copilot, respectively.

(A5) For the interconnected flight controller denoted as any one or more of (A1) through (A4), the pilot interface and the copilot interface may be arranged in a front-to-back tandem-style orientation.

(A6) For the interconnected flight controller denoted as any one or more of (A1) through (A5), the mechanical-disconnect element may include a latching disconnect that provides a physical decoupling of the pilot interface and the copilot interface.

(A7) For the interconnected flight controller denoted as any one or more of (A1) through (A6), the mechanical-disconnect element may include a force-fight mechanism that provides a differential motion between the pilot interface and the copilot interface.

(A8) For the interconnected flight controller denoted as any one or more of (A1) through (A7), adjustable hard stops may be provided that limit travel of the pilot interface and the copilot interface based on aircraft conditions and control law interactions, the hard stops having locations determined by physical stops that are adjustable via an actuator.

(A9) For the interconnected flight controller denoted as any one or more of (A1) through (A8), soft stops may be provided that provide an increased force gradient to motion of the pilot interface and the copilot interface beyond a predetermined position, the force being increased by one or more of a force bias, a force gradient, and a force step change at the predetermined position.

(A10) For the interconnected flight controller denoted as any one or more of (A1) through (A9), one or more vibration mechanisms may be provided for vibrating the pilot interface and the copilot interface to generate a tactile feedback through a grip of the pilot interface and the copilot interface for providing a stall warning indication.

(A11) For the interconnected flight controller denoted as any one or more of (A1) through (A10), a limit device may be provided having an actuator that provides small abrupt movements of the pilot interface and the copilot interface based on a predetermined operating limit to assist with maintaining operation of the aircraft within the predetermined operating limit.

(A12) For the interconnected flight controller denoted as any one or more of (A1) through (A11), the mechanical linkage may include a roll mechanical linkage for roll inputs and a pitch mechanical linkage for pitch inputs.

(A13) For the interconnected flight controller denoted as any one or more of (A1) through (A12), the mechanical disconnect further comprises a roll mechanical-disconnect element within the roll mechanical linkage and a pitch mechanical-disconnect element within the pitch mechanical linkage.

(B1) An interconnected sidestick system for controlling an aircraft may include a first sidestick located on a first side of a cockpit of the aircraft for controlling the aircraft by a pilot, and a second sidestick on a second side of the cockpit, opposite the first side, for controlling the aircraft by a copilot. A roll mechanical linkage may mechanically connect the first sidestick with the second sidestick for providing coordinated motion when a roll input is provided to either of the first or the second sidestick, a roll mechanical-disconnect element within the roll mechanical linkage may disconnect roll inputs between the first sidestick and the second sidestick, and a roll autopilot servo may be coupled to the roll mechanical linkage for providing autopilot feedback to the pilot interface and the copilot interface via the roll mechanical linkage. A pitch mechanical linkage may mechanically connect the first sidestick with the second sidestick for providing coordinated motion therebetween when a pitch input is provided to either of the first or the second sidestick, a pitch mechanical-disconnect element within the pitch mechanical linkage may disconnect pitch inputs between the first sidestick and the second sidestick, and a pitch autopilot servo may be coupled to the pitch mechanical linkage for providing autopilot control or feedback to the pilot interface and the copilot interface via the pitch mechanical linkage.

(B2) For the interconnected sidestick system denoted as (B1), a pilot force-feedback subsystem may be connected to a pilot sensor pack and a copilot force-feedback subsystem may be connected to a copilot sensor pack, the pilot force-feedback subsystem and the copilot force-feedback subsystem may each be adapted to simulate an opposing force of the control surfaces when an input is applied to the pilot interface and the copilot interface, respectively.

(B3) For the interconnected sidestick system denoted as either or both of (B1) or (B2), the roll mechanical-disconnect element and the pitch mechanical-disconnect element may each be adapted to actuate mechanical decoupling of the pilot interface from the copilot interface.

(B4) For the interconnected sidestick system denoted as any one or more of (B1) through (B3), the roll mechanical-disconnect element and the pitch mechanical-disconnect element may each include a crew actuated physical release mechanism for physical decoupling of the pilot interface from the copilot interface.

(B5) For the interconnected sidestick system denoted as any one or more of (B1) through (B4), the roll mechanical-disconnect element and the pitch mechanical-disconnect element may each include a force-based over-center mechanism for physical decoupling of the pilot interface from the copilot interface based on a specified force applied.

(B5) For the interconnected sidestick system denoted as any one or more of (B1) through (B4), a motion damping device that damps the motion of the pilot interface and the copilot interface may be provided to prevent induction of oscillation into the interconnected sidestick system.

(B6) For the interconnected sidestick system denoted as any one or more of (B1) through (B5), the motion damping device may be coupled directly with the pilot interface and the copilot interface.

(B7) For the interconnected sidestick system denoted as any one or more of (B1) through (B6), the motion damping device may be coupled with the pilot force-feedback subsystem and the copilot force-feedback subsystem.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An interconnected flight controller for an aircraft, comprising:
    a pilot interface and a copilot interface;
    a mechanical linkage connecting the pilot interface with the copilot interface for providing motion therebetween of a proportional magnitude and direction when an input is provided to either of the pilot interface or the copilot interface;
    a mechanical-disconnect element within the mechanical linkage, the mechanical-disconnect element being adapted to actuate mechanical decoupling between the pilot interface and the copilot interface;
    one or more sensors coupled to the mechanical linkage on a pilot side of the mechanical-disconnect element for sensing pilot inputs and communicating the pilot inputs to a fly-by-wire flight controller;
    one or more sensors coupled to the mechanical linkage on a copilot side of the mechanical-disconnect element for sensing copilot inputs and communicating the copilot inputs to the fly-by-wire flight controller; and
    adjustable soft stops that provide an increased force gradient to motion of the pilot interface and the copilot interface beyond a predetermined position, the force being increased by one or more of a force bias, a force gradient, and a force step change at the predetermined position,
    a force-feedback subsystem connected to the mechanical linkage to simulate and apply an opposing force of aircraft control surfaces to the pilot interface and the copilot interface, wherein the force-feedback subsystem has a clamping type of rotary spring to reduce potential free play.

2. The interconnected flight controller of claim 1, further comprising an autopilot servo coupled to the mechanical linkage for providing autopilot control or feedback to the pilot interface and the copilot interface via the mechanical linkage.

3. The interconnected flight controller of claim 1, wherein the pilot interface and the copilot interface are sidesticks located on outboard sides of the pilot and copilot, respectively.

4. The interconnected flight controller of claim 1, wherein the pilot interface and the copilot interface are arranged in a front-to-back tandem-style orientation.

5. The interconnected flight controller of claim 1, wherein the mechanical-disconnect element includes a latching disconnect that provides a physical decoupling of the pilot interface and the copilot interface.

6. The interconnected flight controller of claim 1, wherein the mechanical-disconnect element includes a force-fight mechanism that provides a differential motion between the pilot interface and the copilot interface.

7. An interconnected flight controller for an aircraft, comprising:
- a pilot interface and a copilot interface;
- a mechanical linkage connecting the pilot interface with the copilot interface for providing motion therebetween of a proportional magnitude and direction when an input is provided to either of the pilot interface or the copilot interface;
- a mechanical-disconnect element within the mechanical linkage, the mechanical-disconnect element being adapted to actuate mechanical decoupling between the pilot interface and the copilot interface;
- one or more sensors coupled to the mechanical linkage on a pilot side of the mechanical-disconnect element for sensing pilot inputs and communicating the pilot inputs to a fly-by-wire flight controller;
- one or more sensors coupled to the mechanical linkage on a copilot side of the mechanical-disconnect element for sensing copilot inputs and communicating the copilot inputs to the fly-by-wire flight controller; and
- adjustable hard stops that limit travel of the pilot interface and the copilot interface based on aircraft conditions and control law interactions, the hard stops having locations determined by physical stops that are adjustable via an actuator.

8. The interconnected flight controller of claim 7, wherein the hard stops have stop locations set by torque stops in a roll autopilot servo and torque stops in a pitch autopilot servo.

9. The interconnected flight controller of claim 1, further comprising one or more vibration mechanisms for vibrating the pilot interface and the copilot interface to generate a tactile feedback through a grip of the pilot interface and the copilot interface for providing a stall warning indication.

10. The interconnected flight controller of claim 1, further comprising a limit device having an actuator that provides small abrupt movements of the pilot interface and the copilot interface based on a predetermined operating limit to assist with maintaining operation of the aircraft within the predetermined operating limit.

11. The interconnected flight controller of claim 1, wherein the mechanical linkage further comprises a roll mechanical linkage for roll inputs and a pitch mechanical linkage for pitch inputs.

12. The interconnected flight controller of claim 11, wherein the mechanical disconnect further comprises a roll mechanical-disconnect element within the roll mechanical linkage and a pitch mechanical-disconnect element within the pitch mechanical linkage.

13. The interconnected flight controller of claim 1, wherein the mechanical-disconnect element includes a crew actuated physical release mechanism for physical decoupling of the pilot interface from the copilot interface.

14. The interconnected flight controller of claim 1, further comprising a motion damping device that damps the motion of the pilot interface and the copilot interface to prevent induction of oscillation into the mechanical linkage, wherein the motion damping device is coupled directly with the pilot interface and the copilot interface.

15. The interconnected flight controller of claim 1, further comprising a motion damping device that damps the motion of the pilot interface and the copilot interface to prevent induction of oscillation into the mechanical linkage, wherein the motion damping device is coupled with the force-feedback subsystem.

16. The interconnected flight controller of claim 1, wherein the predetermined position of the adjustable softstops is adjusted using movable feel mechanisms attached to an actuator.

17. The interconnected flight controller of claim 1, wherein the predetermined position of the adjustable softstops is adjusted via torque stops in a roll autopilot servo and torque stops in a pitch autopilot servo.

18. The interconnected flight controller of claim 1, wherein the mechanical-disconnect element includes a spring-loaded over-center mechanism for physical decoupling of the pilot interface from the copilot interface.

* * * * *